(12) United States Patent
Suzuki

(10) Patent No.: US 10,391,729 B2
(45) Date of Patent: Aug. 27, 2019

(54) SERVO PRESS, CONTROL METHOD, AND PROGRAM

(71) Applicant: Janome Sewing Machine Co., Ltd., Tokyo (JP)

(72) Inventor: Shinji Suzuki, Tokyo (JP)

(73) Assignee: Janome Sewing Machine Co., Ltd., Tokyo (JP)

(*) Notice: Subject to any disclaimer, the term of this patent is extended or adjusted under 35 U.S.C. 154(b) by 374 days.

(21) Appl. No.: 14/969,344

(22) Filed: Dec. 15, 2015

(65) Prior Publication Data

US 2016/0243780 A1 Aug. 25, 2016

(30) Foreign Application Priority Data

Feb. 24, 2015 (JP) .................................. 2015-034058

(51) Int. Cl.
*B25J 3/04* (2006.01)
*B30B 15/14* (2006.01)
(Continued)

(52) U.S. Cl.
CPC ............ *B30B 15/148* (2013.01); *B30B 15/26* (2013.01); *G05B 19/106* (2013.01); *G05B 2219/2622* (2013.01)

(58) Field of Classification Search
CPC ..... B30B 15/148; B30B 15/26; G05B 19/106; G05B 2219/2622
See application file for complete search history.

(56) References Cited

U.S. PATENT DOCUMENTS 6,237,479 B1* 5/2001 Douba .................... B30B 1/186 100/43
6,647,870 B2 11/2003 Kohno
(Continued)

FOREIGN PATENT DOCUMENTS

JP S54-111592 U1 8/1979
JP S62-047143 B2 10/1987
(Continued)

OTHER PUBLICATIONS

Office Action issued in Japanese Patent Application No. 2015-034058, dated Apr. 23, 2019, with English Translation (6 pages).
(Continued)

*Primary Examiner* — Cuong B Nguyen
*Assistant Examiner* — Samuel Park
(74) *Attorney, Agent, or Firm* — Nakanishi IP Associates, LLC

(57) ABSTRACT

There is provided a servo press capable of performing press working with high accuracy without an increased cost, for example, without any additional special component such as a linear encoder or the like even in a system in which deviation occurs due to disturbances, as well as a control method and a program disturbance. A sensing element is disposed at a stop position of a slide. A servomotor control unit performs: semi-closed loop control based on information detected by a first slide position detection unit disposed at a servomotor, before a signal detection unit detects a signal from the sensing element, and full-closed loop control based on information detected by a second slide position detection unit, after the signal detection unit detects the signal from the sensing element.

6 Claims, 7 Drawing Sheets

(51) Int. Cl.
*G05B 19/10* (2006.01)
*B30B 15/26* (2006.01)

(56) References Cited

U.S. PATENT DOCUMENTS

| | | | |
|---|---|---|---|
| 2002/0096060 A1 | 7/2002 | Kohno | |
| 2007/0234558 A1* | 10/2007 | Takada | H01R 43/048 29/753 |
| 2008/0028817 A1* | 2/2008 | Ribordy | B21D 22/30 72/347 |
| 2008/0034985 A1 | 2/2008 | Suzuki et al. | |
| 2008/0134909 A1* | 6/2008 | Kohno | B30B 1/18 100/48 |
| 2015/0039129 A1* | 2/2015 | Yasuda | B25J 9/1679 700/258 |

FOREIGN PATENT DOCUMENTS

| | | |
|---|---|---|
| JP | H02-224898 A | 9/1990 |
| JP | H05-285544 A | 11/1993 |
| JP | H10-277800 A | 10/1998 |
| JP | 2002-172499 A | 6/2002 |
| JP | 2003-154498 A | 5/2003 |
| JP | 2005-181171 A | 7/2005 |
| JP | 2006-082102 A | 3/2006 |
| JP | 2008-264808 A | 11/2008 |
| JP | 2014-121717 A | 7/2014 |
| TW | 201433434 A | 9/2014 |

OTHER PUBLICATIONS

Notification of Reasons for Refusal issued in Japanese Patent Application No. 2015-034058, dated Nov. 13, 2018, with English Translation (4 pages).

* cited by examiner

SERVO PRESS, CONTROL METHOD, AND PROGRAM

CROSS REFERENCE TO RELATED APPLICATIONS

This application is based on and claims the benefit of priority to Japanese Patent Application No. 2015-034058 filed on Feb. 24, 2015, the contents of which are hereby incorporated by reference in their entirety.

BACKGROUND OF INVENTION

Field of the Invention

The present invention relates to a servo press capable of performing press working with high accuracy even when deviation occurs due to disturbances, as well as to a control method and a program.

Description of Related Art

As can be typically seen, electronics-related products have become more and more high-tech in recent years, and highly accurate quality is demanded for components of such products. This also applies to press working, and various technological improvements have been made in order to meet such demands, for example, highly accurate processing that cannot be achieved by a conventional hydraulic press is performed by a servo press driven by a servomotor.

As one example, Japanese Unexamined Patent Application Publication No. H02-224898 discloses a technique related to a press machine driven by a servomotor and stroke-controlled at a control pattern in which a slide is set. This is a control method called semi-closed loop control for controlling by monitoring an encoder of the servomotor as illustrated in FIG. 5.

Further, there is a control method called full-closed loop control in which as illustrated in FIG. 6, position control is performed by detecting a position of a machine as an object to be controlled using an externally provided encoder, and feeding back. Using this control method, it is possible to perform control without being influenced by an error in ball screws or position variation due to temperature, for example, and to perform highly accurate positioning on a submicron order.

Moreover, there is known hybrid control into which semi-closed loop control and full-closed loop control are integrated as illustrated in FIG. 7 (see Japanese Unexamined Patent Application Publication No. 2006-82102, for example). The hybrid control is a control method that expects for responsiveness of semi-closed loop control and accuracy of full-closed loop control by correcting a position command at a constant cycle based on deviation between an encoder of a servomotor and an externally provided encoder, while constantly performing semi-closed loop control.

CITATION LIST

Patent Literatures

PTL 1: Japanese Unexamined Patent Application Publication No. H02-224898
PTL 2: Japanese Unexamined Patent Application Publication No. 2006-82102

However, the semi-closed loop control has an issue of not being able to respond to mechanical alteration such as thermal expansion.

Further, the full-closed loop control and the hybrid control have an issue of not being able to perform high-speed driving when mechanical rigidity is low, as oscillation occurs. In order to address to such issues, it is necessary to provide a scale (e.g., encoder) over an entire driving range. However, this requires a fairly long scale (e.g., encoder), and also has issues of restriction in attachment and of an increased cost.

Thus, the present invention is made in view of the above issues, and aims to provide a servo press capable of performing press working with high accuracy without an increased cost, for example, without any additional special component such as a linear encoder or the like, even in a system in which deviation occurs due to disturbances, as well as to provide a control method and a program disturbance.

SUMMARY OF INVENTION

One or more embodiments of the invention provide below items in order to solve the above described issues.

Embodiment (1)

One or more embodiments of the invention provide a servo press including: a slide configured to move up and down; a servomotor configured to drive the slide up and down; an encoder disposed at the servomotor; a first slide position detection unit configured to detect a position of the slide based on an output signal from the encoder; a setting unit configured to set a positional condition of the slide; a sensing element disposed at a stop position of the slide; second slide position detection unit configured to detect the position of the slide based on an output signal from the sensing element; a signal detection unit configured to detect a signal from the sensing element; and a servomotor control unit configured to control the servomotor based on the position of the slide detected by one of the first slide position detection unit and the second slide position detection unit, and based on the position condition of the slide that has been set, wherein the servomotor control unit performs: semi-closed loop control based on information detected by the first slide position detection unit disposed at the servomotor, before the signal detection unit detects the signal from the sensing element, and full-closed loop control based on information detected by the second slide position detection unit, after the signal detection unit detects the signal from the sensing element.

According to Embodiment (1), the servomotor control unit performs: semi-closed loop control based on the information detected by the first slide position detection unit, before the signal detection unit detects the signal from the sensing element disposed at the stop position of the slide (ram), and full-closed loop control based on the information detected by the second slide position detection unit, after the signal detection unit detects the signal from the sensing element disposed at the stop position of the slide (ram). Specifically, as the control is switched between semi-closed loop control and full-closed loop control near the stop position of the slide (ram), it is possible to eliminate the issue of semi-closed loop control not being able to respond to mechanical alteration due to thermal expansion. Further, as full-closed loop control is performed from the position near the stop position of the slide (ram) to the stop position of the slide (ram), it is possible to perform stable control without using a special component such as a linear encoder or the like even in a system in which mechanical rigidity is low and oscillation occurs.

Embodiment (2)

One or more embodiments of the invention provide the servo press of Embodiment (1), wherein the sensing element is an increment-type linear encoder, and the signal detection unit detects a Z-phase signal from the increment-type linear encoder.

According to Embodiment (2), the sensing element is the increment-type linear encoder, and the signal detection unit detects a Z-phase signal from the increment-type linear encoder. Here, the increment-type linear encoder outputs a pulse align according to an amount of rotational displacement of an axis. Then, the number of the output pulses is counted by a counter, and the position of the slide (ram) is detected by detecting an amount of rotation based on the count number. Further, the increment-type linear encoder generates a Z-phase signal that is output every full revolution of a rotating plate. In addition, the Z-phase signal may be utilized as an origin point in a full revolution of the rotating plate. Therefore, it is possible to perform highly accurate processing by switching the control to full-closed loop control taking the detection of the Z-phase signal as a trigger, and controlling the slide (ram) to the stop position.

Embodiment (3)

One or more embodiments of the invention provide the servo press of embodiment (2), wherein when the signal detection unit detects the Z-phase signal from the increment-type linear encoder, the servomotor control unit performs full-closed loop control by feeding back a value of the increment-type linear encoder from the position of the slide at which the Z-phase signal from the increment-type linear encoder has been detected to a target stop position.

According to Embodiment (3), when the signal detection unit detects the Z-phase signal from the increment-type linear encoder, the servomotor control unit performs full-closed loop control by feeding back the value of the increment-type linear encoder from the position of the slide (ram) at which the Z-phase signal from the increment-type linear encoder has been detected to the target stop position. That is, before the signal detection unit detects the Z-phase signal from the increment-type linear encoder, the servomotor control unit performs semi-closed loop control based on the information detected by the first slide position detection unit. Then, when the signal detection unit detects the Z-phase signal from the increment-type linear encoder, the servomotor control unit performs full-closed loop control based on the information from the second slide position detection unit, by feeding back a value of the increment-type linear encoder from the position of the slide at which the Z-phase signal from the increment-type linear encoder has been detected to the target stop position. With this, it is possible to eliminate the issue of semi-closed loop control of not being able to respond to mechanical alteration due to thermal expansion. Further, as the servomotor control unit performs full-closed loop control based on the information from the second slide position detection unit, by feeding back a value of the increment-type linear encoder from the position of the slide (ram) at which the signal detection unit has detected the Z-phase signal from the increment-type linear encoder to the target stop position, it is possible to perform stable control without using a special component even in a system in which mechanical rigidity is low and oscillation occurs. Moreover, as the servomotor control unit performs full-closed loop control based on the information from the second slide position detection unit, by feeding back a value of the increment-type linear encoder from the position of the slide at which the Z-phase signal from the increment-type linear encoder has been detected to the target stop position, processing accuracy of a workpiece is improved.

Embodiment (4)

One or more embodiments of the invention provide the servo press of embodiment (2), wherein an attachment position of the increment-type linear encoder in a direction in which the slide moves is set based on a reference stop position of the slide.

According to Embodiment (4), the attachment position of the increment-type linear encoder with respect to the direction of movement of the slide (ram) is set based on the reference stop position of the slide (ram). Therefore, as the attachment position of the increment-type linear encoder with respect to the direction of movement of the slide (ram) is set based on the reference position of the workpiece, accuracy in processing position of a workpiece and processing accuracy of the workpiece are improved.

Embodiment (5)

One or more embodiments of the invention provide a control method for a servo press including: a slide configured to move up and down; a servomotor configured to drive the slide up and down; an encoder disposed at the servomotor; a first slide position detection unit configured to detect a position of the slide based on an output signal from the encoder; a setting unit configured to set a positional condition of the slide; a sensing element disposed at a stop position of the slide; a second slide position detection unit configured to detect the position of the slide based on an output signal from the sensing element; a signal detection unit configured to detect a signal from the sensing element; and a servomotor control unit configured to control the servomotor based on the position of the slide detected by one of the first slide position detection unit and the second slide position detection unit, and based on the position of the slide that has been set, the method including: a first step of controlling the servomotor, by the servomotor control unit, based on information detected by the first slide position detection unit disposed at the servomotor; a second step of detecting, by the signal detection unit, a signal from the sensing element disposed at a stop position of the slide; and a third step of controlling the servomotor, by the servomotor control unit, when the signal detection unit detects the signal from the sensing element disposed at the stop position of the slide, based on information detected by the second slide position detection unit.

According to Embodiment (5), the servomotor control unit performs: semi-closed loop control based on the information detected by the first slide position detection unit, before the signal detection unit detects the signal from the sensing element disposed at the stop position of the slide (ram), and full-closed loop control based on the information detected by the second slide position detection unit, after the signal detection unit detects the signal from the sensing element disposed at the stop position of the slide (ram). Specifically, as the control is switched between semi-closed loop control and full-closed loop control near the stop position of the slide (ram), it is possible to eliminate the issue of semi-closed loop control of not being able to respond to mechanical alteration due to thermal expansion. Further, as full-closed loop control is performed from the position near the stop position of the slide (ram) to the stop position of the slide (ram), it is possible to perform stable control without using a special component such as a linear encoder or the like even in a system in which mechanical rigidity is low and oscillation occurs.

Embodiment (6)

One or more embodiments of the invention provide a program for having a computer execute a control method for a servo press including: a slide configured to move up and down; a servomotor configured to drive the slide up and down; an encoder disposed at the servomotor; a first slide position detection unit configured to detect a position of the slide based on an output signal from the encoder; a setting unit configured to set a positional condition of the slide; a sensing element disposed at a stop position of the slide; a second slide position detection unit configured to detect the position of the slide based on an output signal from the sensing element; a signal detection unit configured to detect a signal from the sensing element; and a servomotor control unit configured to control the servomotor based on the position of the slide detected by one of the first slide position detection unit and the second slide position detection unit, and based on the position of the slide that has been set, the program causing the computer to execute: a first step of controlling the servomotor, by the servomotor control unit, based on information detected by the first slide position detection unit disposed at the servomotor; a second step of detecting, by the signal detection unit, a signal from the sensing element disposed at a stop position of the slide; and a third step of controlling the servomotor, by the servomotor control unit, when the signal detection unit detects the signal from the sensing element disposed at the stop position of the slide, based on information detected by the second slide position detection unit.

According to Embodiment (6), the servomotor control unit performs: semi-closed loop control based on the information detected by the first slide position detection unit, before the signal detection unit detects the signal from the sensing element disposed at the stop position of the slide (ram), and full-closed loop control based on the information detected by the second slide position detection unit, after the signal detection unit detects the signal from the sensing element disposed at the stop position of the slide (ram). Specifically, as the control is switched between semi-closed loop control and full-closed loop control near the stop position of the slide (ram), it is possible to eliminate the issue of semi-closed loop control of not being able to respond to mechanical alteration due to thermal expansion. Further, as full-closed loop control is performed from the position near the stop position of the slide (ram) to the stop position of the slide (ram), it is possible to perform stable control without using a special component such as a linear encoder or the like even in a system in which mechanical rigidity is low and oscillation occurs.

According to one or more embodiments of the present invention, as the control is switched between semi-closed loop control and full-closed loop control near the stop position of the slide (ram), it is possible to eliminate the issue of semi-closed loop control of not being able to respond to mechanical alteration due to thermal expansion. Further, as full-closed loop control is performed from the position near the stop position of the slide (ram) to the stop position of the slide (ram), there is an effect that stable control may be performed without using a special component such as a linear encoder or the like even in a system in which mechanical rigidity is low and oscillation occurs.

According to one or more embodiments of the present invention, there is an effect that highly accurate processing may be performed by the servomotor control unit controlling the slide (ram) to the stop position by switching the control to full-closed loop control taking the detection of the Z-phase signal from the increment-type linear encoder as a trigger.

According to one or more embodiments of the present invention, there is an effect of improving processing accuracy, as when the signal detection unit detects the Z-phase signal from the increment-type linear encoder, the servomotor control unit performs full-closed loop control by feeding back the value of the increment-type linear encoder from the position of the slide (ram) at which the Z-phase signal from the increment-type linear encoder has been detected to the target stop position.

According to one or more embodiments of the present invention, as the attachment position of the increment-type linear encoder with respect to the direction of movement of the slide (ram) is set based on a reference position of a workpiece, there is an effect of improving accuracy in processing position of a workpiece and processing accuracy of the workpiece.

DETAILED DESCRIPTION

Hereinafter, an embodiment of the present invention will be described in detail with reference to the drawings.

It should be noted that components in this embodiment may be replaced by existing components as appropriate, and variations including combinations with other existing components may also be possible. Therefore, the description of this embodiment may not limit the scope of the invention defined by the claims.

Embodiment

Hereinafter, the embodiment of the present invention will be described with reference to FIG. 1 through FIG. 4.

Figure 1:
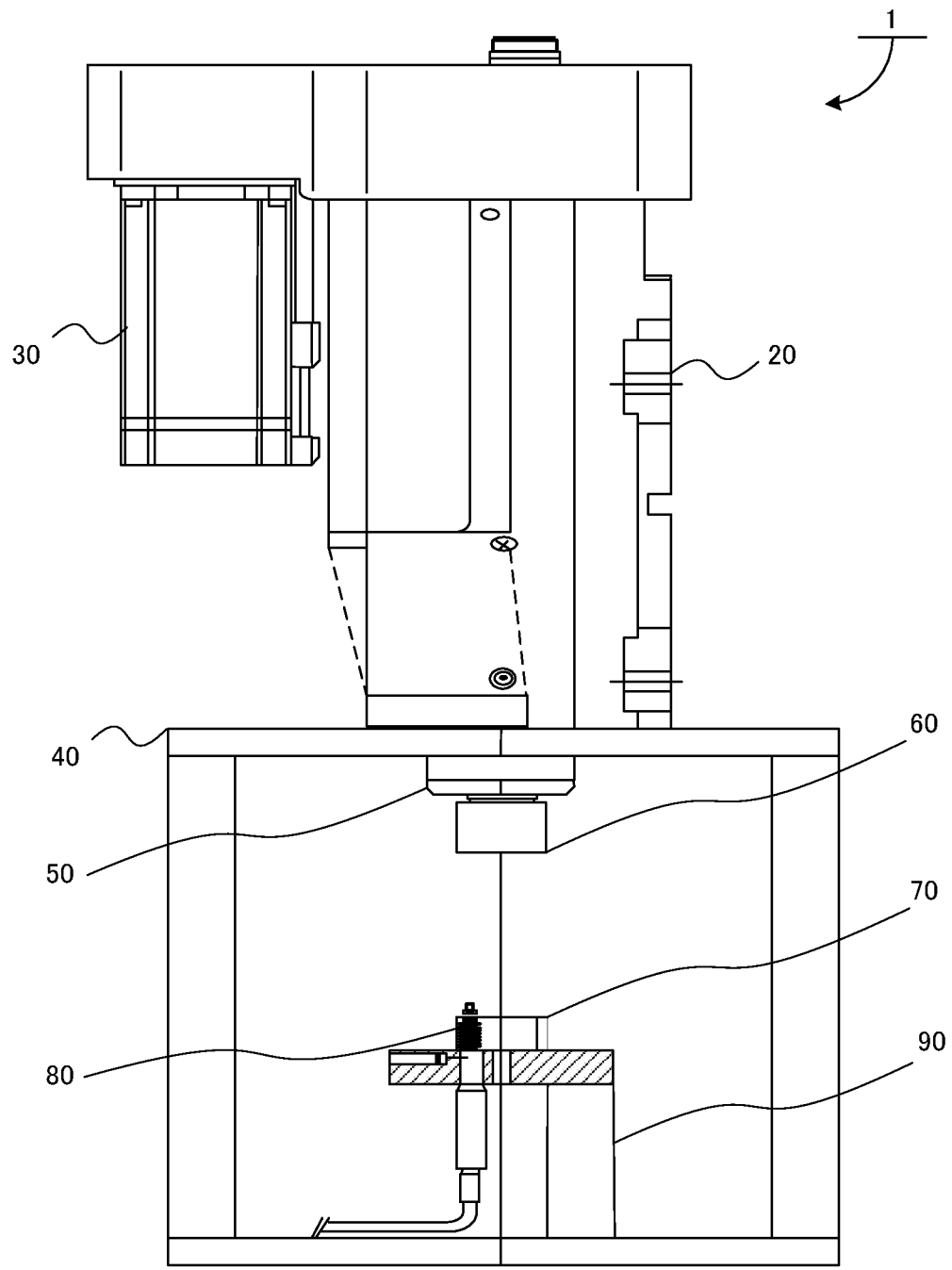
FIG. 1 is a side view of a servo press according to one or more embodiments of the present invention.

As illustrated in FIG. 1, a servo press 1 according to this embodiment is configured by a press main body 20, a servomotor 30, a table 40 on which the press main body 20 is placed, a ram 50 moving up and down with respect to the press main body 20, a shank 60, a workpiece 70, an increment-type linear encoder 80, and a workpiece attachment base 90 for attaching a workpiece.

The servo press 1 is provided with a frame that is not shown, and the table 40 is provided under the frame. The workpiece attachment base 90 is disposed horizontally within the table 40, and the workpiece 70 is attached to an upper surface of the workpiece attachment base 90. Further, the ram 50 and the shank 60 disposed at a tip portion of the ram 50 are inserted through the press main body 20 into the table 40, and move up and down.

The ram 50 is connected with the servomotor 30 via a power conversion member and a rotation transmission member that are not shown, and driven by the servomotor 30. Further, the servomotor 30 is connected to a control device that will be later described. The ram 50 driven by the servomotor 30 is controlled based on a control pattern that has been input to the control device or a control pattern automatically set based on a processing condition that has been input. In this control, the ram 50 is driven from a rising point (start position) to a lowering point (stop position) to perform press working, and an intermediate point is defined between the rising point (start position) and the lowering point (stop position). Processing may be performed more accurately by setting a different speed from the intermediate point to the lowering point (stop position).

<Overall Configuration and Control>

An overall configuration and control of the servo press according to this embodiment will be described with reference to FIG. 2 and FIG. 3.

Figure 2:
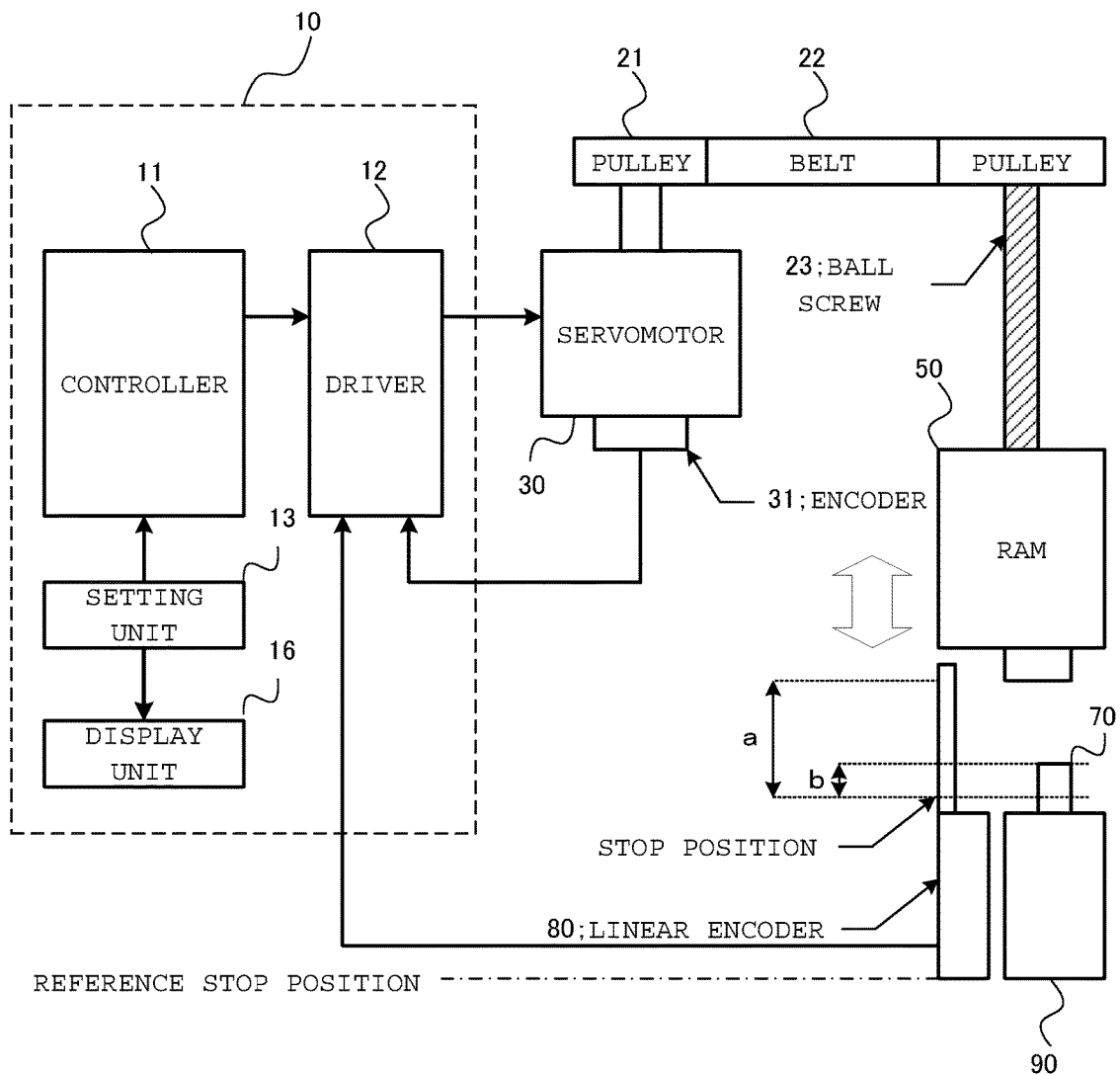
FIG. 2 is overall illustration of a structure and control of the servo press according to one or more embodiments of the present invention.

As illustrated in FIG. 2, the servo press 1 according to this embodiment is configured by a control device 10, a controller 11 that constitutes a control device 10, a driver 12, a setting unit 13, a display unit 16, a pulley 21, a belt 22, a ball screw 23, the servomotor 30, an encoder 31, the ram 50, the workpiece 70, the increment-type linear encoder 80, and the workpiece attachment base 90.

Above the frame, the servomotor 30 as a power source of the servo press 1 and the pulley 21 as the rotation transmission member for converting a rotative force of the servomotor 30 into reciprocating movement are attached. The servomotor 30 is provided with the encoder 31 for detecting rotating speed, and the rotating speed of the servomotor 30 is controlled by the control device 10 controlling current. The rotative force of the servomotor 30 is transmitted to the ball screw 23 by the belt 22 as the rotation transmission member. The servomotor 30 may be either of an alternating-current motor and a direct-current motor.

Further, the rotation transmission member is exemplified by, but not limited to, the pulley 21, and may be a chain or a gear. Moreover, the rotation transmission member may be directly coupled to an output axis of the servomotor 30. Furthermore, the power conversion device is exemplified by, but not limited to, the ball screw 23, and may be a screw mechanism, a combination of a worm gear and a worm wheel, or a combination of a pinion gear and a rack. To a lower end of the ball screw 23, the ram 50 that moves up and down at a position facing against the workpiece attachment base 90 is attached, and press working is performed to an object to be processed by the ram 50 moving down from an uppermost position (start position) to a lowermost position (stop position). Then, the ram 50 moves up to the uppermost position (start position), after reaching the lowermost position (stop position) and processing to the object to be processed ends.

The encoder 31 is attached to a predetermined position of the servomotor 30. The increment-type linear encoder 80 is disposed at a stop position of the ram 50. Specifically, the increment-type linear encoder 80 configured such that its attachment position with respect to a direction in which the ram 50 moves is set based on a reference stop position of the ram 50. As the attachment position of the increment-type linear encoder 80 with respect to the direction of movement of the ram is set based on a reference position of a workpiece, accuracy in processing position of a workpiece and processing accuracy of the workpiece are improved.

Here, detection of the position of the ram 50 using the increment-type linear encoder 80 is performed using the increment-type linear encoder 80 placed near the stop position the ram 50 and placed on the workpiece attachment base 90 such that its axial direction is parallel to an up-down direction which is the direction in which the ram 50 moves, and a detection head fixed to the ram 50 that is provided at a position facing against the increment-type linear encoder 80 and that is not shown. In other words, by the detection head moving up and down with respect to the increment-type linear encoder 80 that is fixed along with the up and down movement of the ram 50, a sensor built within the detection head detects the position of the ram 50 as a height based on the reference stop position of the ram 50.

In press working, data such as operating speed of the ram 50, a switching position of the speed, lowermost position (stop position), and processing time as control conditions, is set via the setting unit 13. The set data is displayed in the display unit 16. The display unit 16 is configured by a setting switch and unit such as a liquid crystal display screen or a CRT. Further, the display unit 16 is provided with switches for selecting an operational mode such as operation and condition setting, and for instructing operation such as automatic operation or manual operation, for example.

Then, the control data input through the display unit 16 is taken and recorded in a memory unit that is later described, and the ram 50 is controlled according to a previously installed procedures. The control device 10 is configured as a commonly-used computer or the like having functions such as data recording, computation, data display, and input and output of data.

Then, the control device 10 calculates a speed or a torque command for the servomotor 30 such that the servo press 1 is operated under the set condition, based on positional data of the ram 50 detected by a first position detecting unit and a second ram position detecting unit of the servomotor 30, and outputs the calculated command. Then, by controlling the servomotor 30 based on the control command, the ram 50 performs predetermined movement that has originally been set, and performs processing to an object to be processed under the predetermined condition.

It should be noted that, the servo press 1 according to this embodiment performs: semi-closed loop control based on information detected by the first position detecting unit 33 that is disposed at the servomotor 30 and will be described later, before a signal detecting unit that will be described later detects a signal from the increment-type linear encoder 80 disposed at the stop position of the ram 50, and full-closed loop control based on information detected by a second position detecting unit, after the signal detecting unit detects the signal from the increment-type linear encoder 80 disposed at the stop position of the ram 50. The details will be described in the following, with reference to a functional block diagram in FIG. 3.

<Functional Blocks of Servo Press>

Figure 3:
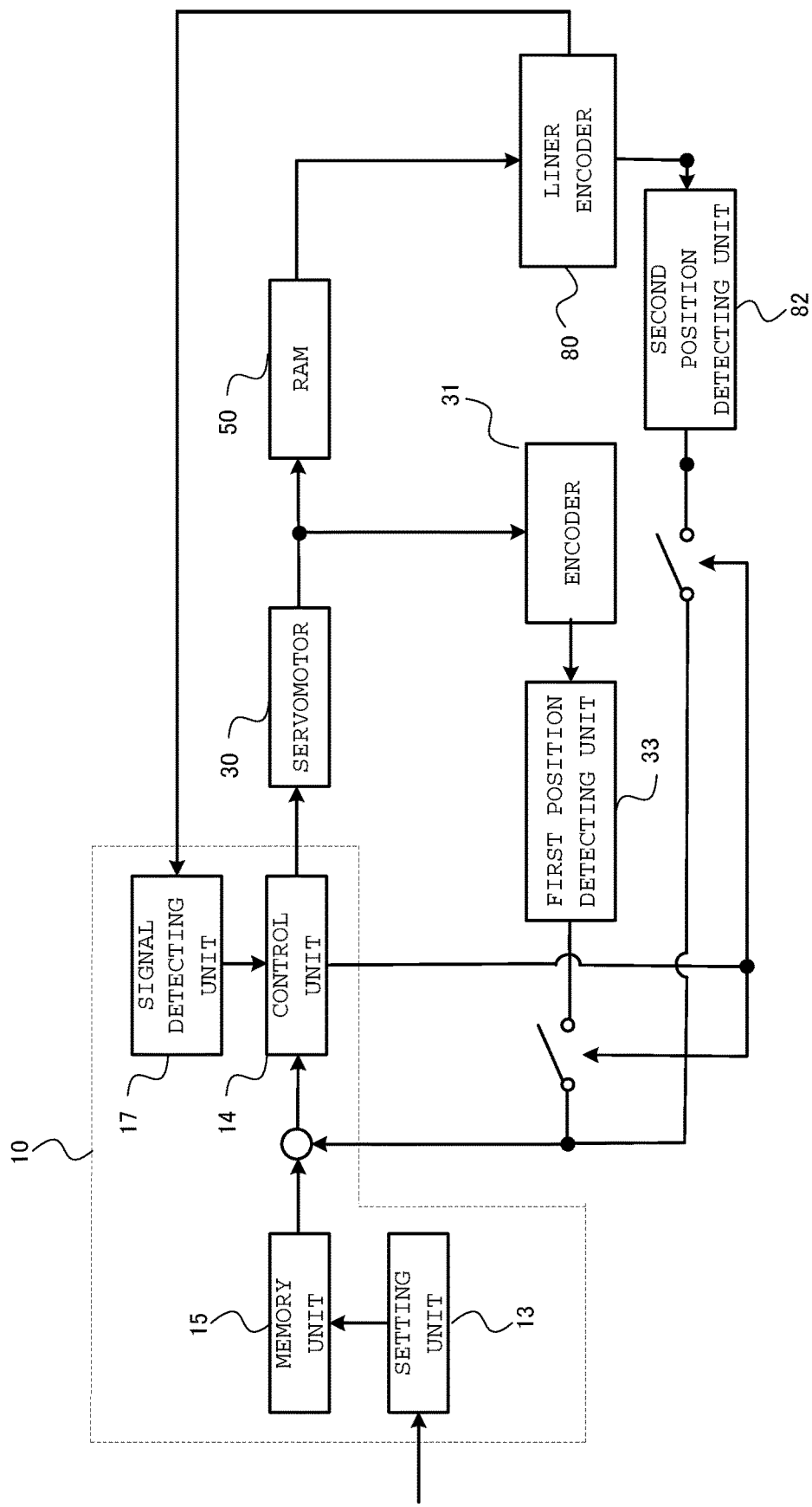
FIG. 3 is a functional block diagram of the servo press according to one or more embodiments of the present invention.

As illustrated in FIG. 3, the servo press 1 according to this embodiment is configured by the control device 10, the setting unit 13 that constitutes the control device 10, a control unit 14, a memory unit 15, the display unit 16, a signal detecting unit 17, the servomotor 30, the encoder 31, a first position detecting unit 33, the ram 50, the increment-type linear encoder 80, and a second position detecting unit 82. The servo press 1 according to this embodiment is characterized by switching a control method from semi-closed loop control to full-closed loop control taking the signal detecting unit 17 receiving a Z-phase signal from the increment-type linear encoder 80 as a trigger.

Specifically, before the signal detecting unit 17 detects a Z-phase signal from the increment-type linear encoder 80, a servo loop of semi-closed loop control is closed, and the downward movement of the ram 50 is controlled by position information from the first position detecting unit 33 and a previously set operating condition. In other words, the downward movement of the ram 50 is controlled by calculating deviation based on the operating condition previously set and stored in the memory unit 15 and the position information obtained from the first position detecting unit 33, and by applying an applied voltage corresponding to a control amount obtained by the control unit 14 based on the calculated deviation to the servomotor 30.

At this time, the downward movement of the ram 50 is subjected to motion control. In other words, a high-speed approach control is performed down to a previously set lowering position, and low-speed prove control is performed from the previously set lowering position. Specifically, output torque is detected from current of the servomotor command controlling the servomotor 30, and motion change of the ram 50 is detected as a change in the torque of the servomotor 30. Then, the previously set lowering position is again specified based on the detected signal of the change in the torque.

Further, the control unit 14 controls the ram 50 to perform a predetermined motion by calculating a speed command value for the servomotor 30 such that the position of the ram 50 detected by the first position detecting unit 33 corresponds to motion setting data recorded in the memory unit 15, and by controlling motor driving current such that deviation between the calculated speed command value and a speed feedback signal based on speed information obtained by the detected value detected by the first position detecting unit 33 becomes smaller.

On the other hand, after the signal detecting unit 17 receives the Z-phase signal from the increment-type linear encoder 80, the servo loop of semi-closed loop control is separated and a servo loop of full-closed loop control is closed, and the downward movement of the ram 50 is controlled by position information based on a signal from the second position detecting unit 82 and a previously set operating condition. In other word, the downward movement of the ram 50 is controlled by calculating the deviation based on the operating condition previously stored in the memory unit 15 and the position information obtained from the second position detecting unit 82, and by applying an applied voltage corresponding to the control amount obtained by the control unit 14 based on the calculated deviation to the servomotor 30.

<Control Processing of Servo Press>

Figure 4:
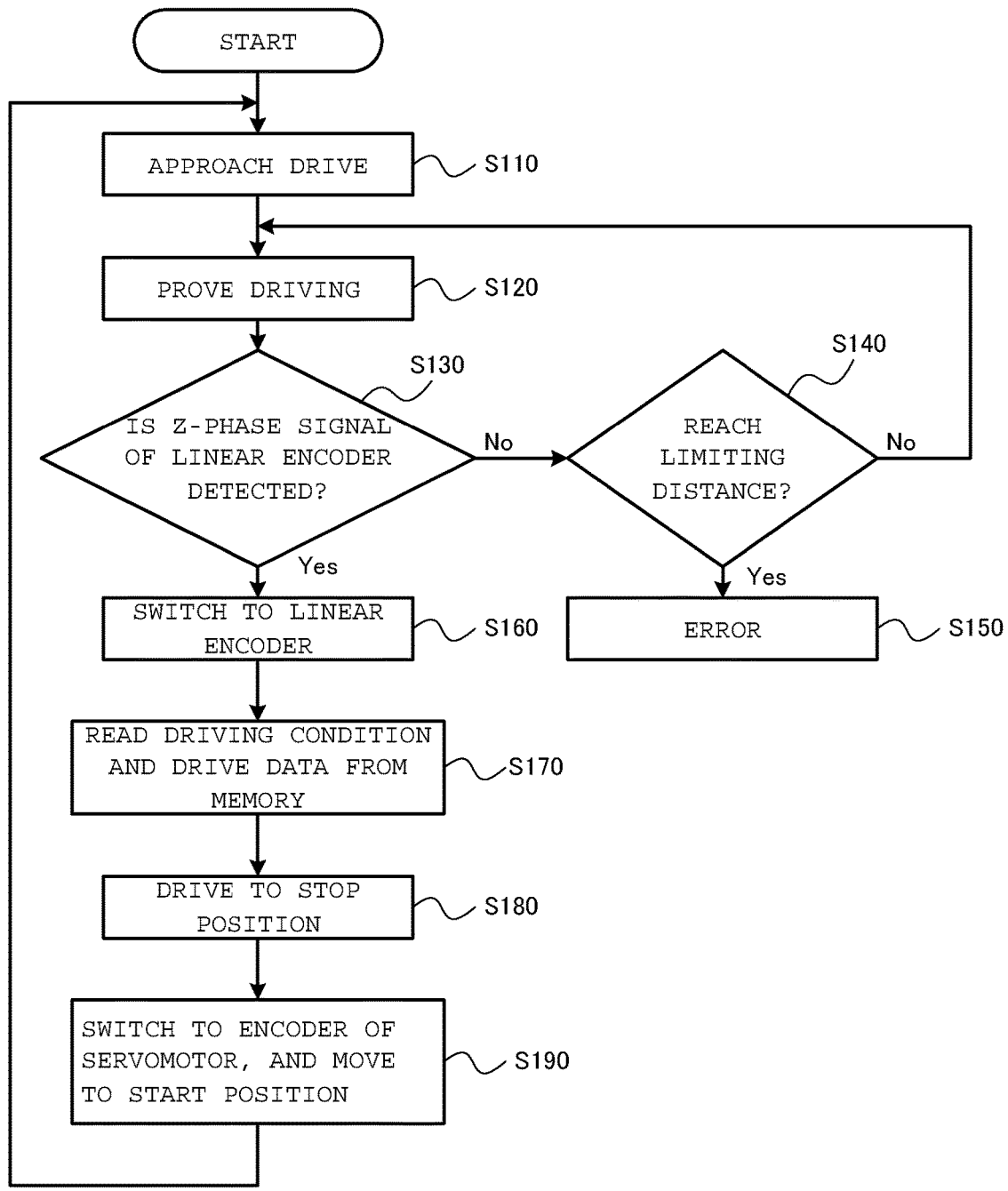
FIG. 4 is a flowchart of control of the servo press according to one or more embodiments of the present invention.
Figure 5:
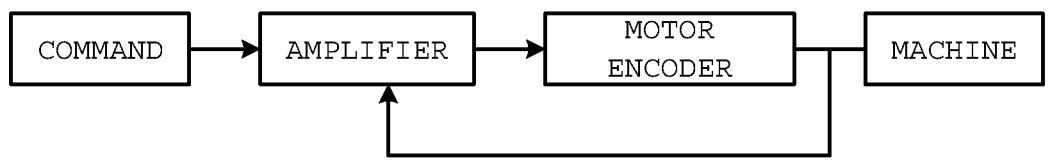
FIG. 5 is a functional block diagram according to a conventional example.
Figure 6:
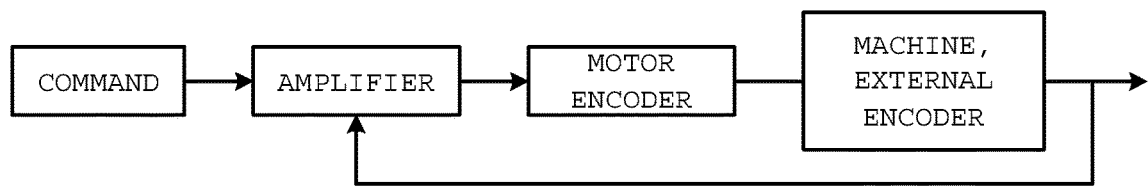
FIG. 6 is a functional block diagram according to the conventional example.
Figure 7:
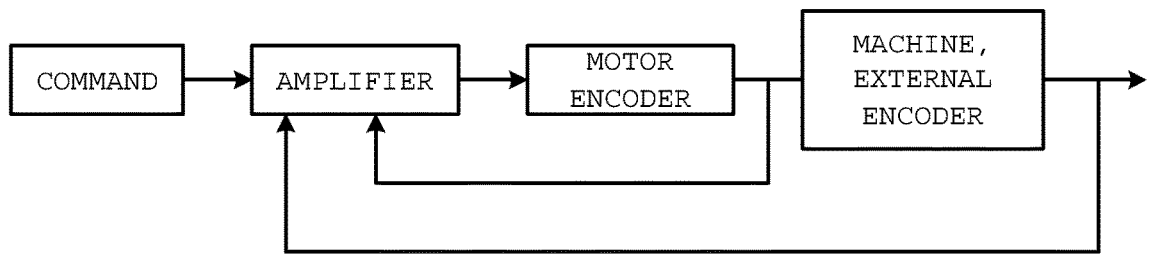
FIG. 7 is a functional block diagram according to the conventional example.

Control processing of the servo press according to this embodiment will be described with reference to FIG. 4.

The control unit 14 closes the servo loop of semi-closed loop control, and performs approach driving by which the ram 50 is moved at high speed (Step S110). When the ram 50 is determined to have moved down to a previously determined specific position based on a signal from the first position detecting unit 33, the control unit 14 performs motion control to switch to prove control of moving the ram 50 at low speed (Step S120).

Then, if the signal detecting unit 17 detects a Z-phase signal from the increment-type linear encoder 80 ("Yes" in Step S130), the control unit 14 separates the servo loop of semi-closed loop control based on a detection signal output from the signal detecting unit 17, closes the servo loop of full-closed loop control, and shifts the control to full-closed loop control based on the position information based on a signal from the second position detecting unit 82 (Step S160).

Upon shifting to full-closed loop control, a driving condition and drive data are read from a memory that constitutes the memory unit 15 (Step S170), and the downward movement of the ram 50 to the stop position of the ram 50 is controlled based on this information and the position information based on the second position detecting unit 82 (Step S180).

Subsequently, upon reaching of the ram 50 to the stop position, the servo loop of full-closed loop control is separated, the servo loop of semi-closed loop control is closed, the control shifts to semi-closed loop control based on the position information based on the signal from the first position detecting unit 33, and the ram 50 is moved to the start position (Step S190). Thereafter, the operation returns to Step S110.

On the other hand, in Step S130, if the signal detecting unit 17 does not detect a Z-phase signal from the increment-type linear encoder 80 ("No" in Step S130), it is determined whether or not the ram 50 is at a position reaching the limiting distance. If it is determined that the ram 50 has reached the limiting distance ("Yes" in Step S140), the operation stops due to error, and if it is determined that the ram 50 has not reached the limiting distance ("No" in Step S140), the operation returns to Step S120.

As described above, according to this embodiment, as the control is switched between semi-closed loop control and full-closed loop control near the stop position of the ram 50, it is possible to eliminate the issue of semi-closed loop control of not being able to respond to mechanical alteration due to thermal expansion. Further, as full-closed loop control is performed from the position near the stop position of the ram 50 to the stop position of the ram, it is possible to perform stable control without using a special component such as a linear encoder or the like even in a system in which mechanical rigidity is low and oscillation occurs.

It should be noted that it is possible to realize the servo press according to the present invention by recording the processing of the servo press described above in a medium that is readable by a computer system, and having the servo press read and execute the recorded in the medium. As used herein, examples of the computer system include an OS and hardware such as peripheral devices.

In a case in which WWW (World Wide Web) system is utilized, the examples of the "computer system" further include a web page providing environment (or display environment). Further, the program may be transmitted to other computer systems from the computer system having the program recorded in its recording device or the like, via a transmission medium, or a transmitted wave in the transmission medium. As used herein, the "transmission medium" that transmits the program refers to a medium having a function of transmitting information, examples of which including a network (communication network) such as the Internet and a communication line (communication wire) such as a telephone line.

Moreover, the program may realize a part of the functions described above. Furthermore, the program may be a so-called difference file (difference program) that may realize the functions described above in combination with a program that is already recorded in the computer system.

Thus, the embodiment of this invention has been described with the drawings, but specific configurations are not limited to the embodiment described above, and include various designs not departing from the scope of the invention.

REFERENCE SIGNS LIST

1: servo press
10: control device
11: controller
12: driver
13: setting unit
14: control unit
15: memory unit
16: display unit
17: signal detecting unit
20: press main body
21: pulley
22: belt
23: ball screw
30: servomotor
31: encoder
33: first position detecting unit
40: table
50: ram
60: shank
70: workpiece
80: increment-type linear encoder
82: second position detecting unit

What is claimed is:

1. A servo press comprising:
a slide configured to move up and down;
a servomotor configured to drive the slide up and down;
an encoder disposed at the servomotor;
a first slide position detection unit configured to detect a position of the slide based on position change of the slide calculated based on an output signal from the encoder, the output signal corresponding to motion of the servomotor;
a setting unit configured to set a positional condition of the slide;
a sensing element disposed at a stop position of the slide;
a second slide position detection unit configured to detect the position of the slide based on an output signal from the sensing element;
a signal detection unit configured to detect a signal from the sensing element; and
a servomotor control unit configured to control the servomotor based on the position of the slide detected by one of the first slide position detection unit and the second slide position detection unit, and based on the position condition of the slide that has been set, wherein
the servomotor control unit performs:
semi-closed loop control based on information detected by the first slide position detection unit disposed at the servomotor, before the signal detection unit detects the signal from the sensing element, and
shifting from the semi-closed control to full-closed loop control based on information detected by the second slide position detection unit, to move the slide to a target stop position, after the signal detection unit detects the signal from the sensing element.

2. A servo press comprising:
a slide configured to move up and down;
a servomotor configured to drive the slide up and down;
an encoder disposed at the servomotor;
a first slide position detection unit configured to detect a position of the slide based on position change of the slide calculated based on an output signal from the encoder, the output signal corresponding to motion of the servomotor;
a setting unit configured to set a positional condition of the slide;
a sensing element disposed at a stop position of the slide;
a second slide position detection unit configured to detect the position of the slide based on an output signal from the sensing element;
a signal detection unit configured to detect a signal from the sensing element; and
a servomotor control unit configured to control the servomotor based on the position of the slide detected by one of the first slide position detection unit and the second slide position detection unit, and based on the position of the slide that has been set, wherein
the sensing element is an increment-type linear encoder, and the signal detection unit detects a Z-phase signal from the increment-type linear encoder, and
the servomotor control unit performs:
semi-closed loop control based on information detected by the first slide position detection unit disposed at the servomotor, before the signal detection unit detects the signal from the sensing element, and
full-closed loop control based on information detected by the second slide position detection unit, to move the slide to a target stop position, after the signal detection unit detects the signal from the sensing element.

3. The servo press according to claim 2, wherein
when the signal detection unit detects the Z-phase signal from the increment-type linear encoder, the servomotor control unit performs full-closed loop control by feeding back a value of the increment-type linear encoder from the position of the slide at which the Z-phase signal from the increment-type linear encoder has been detected to a target stop position.

4. The servo press according to claim 2, wherein
an attachment position of the increment-type linear encoder, which is a position on a line extending in a moving direction of the slide, is set based on a reference stop position of the slide.

5. The servo press according to claim 3, wherein
an attachment position of the increment-type linear encoder, which is a position on a line extending in a moving direction of the slide, is set based on a reference stop position of the slide.

6. A control method for a servo press including:
a slide configured to move up and down; a servomotor configured to drive the slide up and down; an encoder disposed at the servomotor; a first slide position detection unit configured to detect a position of the slide based on position change of the slide calculated based on an output signal from the encoder, the output signal corresponding to motion of the servomotor; a setting unit configured to set a positional condition of the slide;

a sensing element disposed at a stop position of the slide; a second slide position detection unit configured to detect the position of the slide based on an output signal from the sensing element; a signal detection unit configured to detect a signal from the sensing element; and a servomotor control unit configured to control the servomotor based on the position of the slide detected by one of the first slide position detection unit and the second slide position detection unit, and based on the position of the slide that has been set, the method comprising:

a first step of performing semi-closed loop control of the servomotor, by the servomotor control unit, based on information detected by the first slide position detection unit disposed at the servomotor, before the signal detection unit detects the signal from the sensing element;

a second step of detecting, by the signal detection unit, a signal from the sensing element disposed at a stop position of the slide; and a third step of shifting from the semi-closed loop control of the servomotor, by the servomotor control unit, based on information detected by the first slide position detection unit disposed at the servomotor, to full-closed loop control of the servomotor to move the slide to a target stop position, by the servomotor control unit, wherein the third step is performed when the signal detection unit detects the signal from the sensing element disposed at the stop position of the slide, based on information detected by the second slide position detection unit.

* * * * *